(12) United States Patent
Druant

(10) Patent No.: US 12,065,039 B2
(45) Date of Patent: Aug. 20, 2024

(54) TORQUE VECTORING UNIT

(71) Applicant: Dana Belgium N.V., Bruges (BE)

(72) Inventor: Joachim Druant, Merkem (BE)

(73) Assignee: DANA BELGIUM N.V., Bruges (BE)

( * ) Notice: Subject to any disclaimer, the term of this patent is extended or adjusted under 35 U.S.C. 154(b) by 341 days.

(21) Appl. No.: 17/645,017

(22) Filed: Dec. 17, 2021

(65) Prior Publication Data
US 2022/0194209 A1 Jun. 23, 2022

(30) Foreign Application Priority Data

Dec. 17, 2020 (DE) ............... 20 2020 107 337.0

(51) Int. Cl.
G05B 17/00 (2006.01)
B60K 7/00 (2006.01)
B60L 15/20 (2006.01)
B60L 15/36 (2006.01)
H02P 5/46 (2006.01)
H02P 21/20 (2016.01)

(52) U.S. Cl.
CPC ........ B60K 7/0007 (2013.01); B60L 15/2036 (2013.01); B60L 15/36 (2013.01); H02P 5/46 (2013.01); H02P 21/20 (2016.02)

(58) Field of Classification Search
CPC ... H02P 21/20; H02P 5/46; B60K 7/00; B60L 15/2036; B60L 15/36
See application file for complete search history.

(56) References Cited

U.S. PATENT DOCUMENTS

2018/0304744 A1* 10/2018 Wang .................. B60K 17/165

FOREIGN PATENT DOCUMENTS

EP 725474 A1 * 8/1996 ............... B60K 6/26

* cited by examiner

*Primary Examiner* — Karen Masih
(74) *Attorney, Agent, or Firm* — McCoy Russell LLP

(57) ABSTRACT

Embodiments for a torque vectoring unit for an electric vehicle are provided herein. In an example, a torque vectoring unit includes an inner rotor, an outer rotor enclosing the inner rotor, and a stator enclosing the outer rotor, with the inner rotor, the outer rotor and the stator being concentrically arranged to one another. The inner rotor is drivingly connectable to a first wheel and the outer rotor is drivingly connectable to a second wheel, and the inner rotor and the outer rotor represent a first electric motor and the outer rotor and the stator represent a second electric motor.

20 Claims, 4 Drawing Sheets

TORQUE VECTORING UNIT

CROSS-REFERENCE TO RELATED APPLICATION

The present application claims priority to German Utility Model Application No. 20 2020 107 337.0, entitled "TORQUE VECTORING UNIT", and filed on Dec. 17, 2020. The entire contents of the above-listed application is hereby incorporated by reference for all purposes.

TECHNICAL FIELD

The present disclosure relates to a torque vectoring unit for an electric vehicle.

BACKGROUND AND SUMMARY

Torque vectoring is a technology employed, for instance, in automobile transmissions. In general, a differential as a part of a transmission transfers torque delivered by the engine to the wheels. Torque vectoring technology provides the differential with the ability to vary the delivered torque among the wheels.

Torque vectoring systems have been implemented in various ways in the prior art. However, each of these implementations exhibits several shortcomings. Some known systems are shown in FIG. 1. In a first implementation A, a two-wheel axle with wheels 1A and 2A is provided with two separate electric traction motors 3A and 4A, i.e. one traction motor for each wheel, for independently delivering torque to the wheels 1A, 2A. This implementation has the disadvantages that two high-power inverters are required, a comparatively small operating area is provided, two separate electric machines are required and a high overall weight and volume of the driving unit is reached. In a second implementation B a twin clutch 5B is employed for torque vectoring in the drive unit on a two-wheel axle with wheels 1B, 2B. The twin clutch 5B is upstream connected to an electric traction motor 3B and a fixed-ratio transmission 4B. This implementation has the disadvantages that the twin clutch 5B is subject to slip losses, the operating area of this implementation is still comparatively small, even though it is larger than the operating area of implementation A, and dynamics is low. A third implementation C makes use of a superimposing transmission. Implementation C comprises a main electric traction motor 3C and a control motor 5C delivering the differential torque to the wheels 1 and 2. A transmission 4C is disposed between main electric motor 3C and control motor 5C. The transmission 4C comprises a final drive planetary facing the main electric motor 3C, a differential as the middle part of the transmission 4C and intermediate planet stages facing the control motor 5C. The disadvantages of this implementation are a high mechanical system complexity, high cost intensity, since many planetary gear sets are required, and a still limited operating area, even though it is much larger than in case of implementation A.

Based on above mentioned shortcomings of the known prior art systems an object of the present disclosure is therefore to provide a compact and energy efficient torque vectoring unit that has low complexity, improved dynamics and an increased operating area.

The torque vectoring unit for an electric vehicle according to the present disclosure comprises an inner rotor, an outer rotor enclosing the inner rotor, and a stator enclosing the outer rotor, the inner rotor, the outer rotor and the stator being concentrically arranged to one another, wherein the inner rotor is drivingly connectable to a first wheel and the outer rotor is drivingly connectable to a second wheel, and wherein the inner rotor and the outer rotor represent a first electric motor and the outer rotor and the stator represent a second electric motor.

The torque vectoring unit according to the present disclosure is compact, since it combines two electric motors for independently driving the first and second wheel into one concentric design. It is energy efficient since differential torque or speed between motor and wheels is not dissipated in clutches, but can be recuperated. Moreover, the torque vectoring unit according to the present disclosure is very dynamic since it does not require opening and closing of clutches. The wheel torque is generated in a purely electromagnetic manner and thus very dynamic. In addition, in comparison to other torque vectoring systems known in the prior art, the torque vectoring unit according to the present disclosure enables a larger torque vectoring operating area for the same installed power.

According to an embodiment of the present disclosure, the torque vectoring unit may further comprise a first and a second inverter, wherein the first inverter is electrically connected to the inner rotor and the second inverter is electrically connected to the stator.

According to an embodiment of the present disclosure the first inverter may be a low-power inverter and the second inverter may be a high-power inverter.

According to another embodiment of the present disclosure the second inverter may be configured to provide a main power to the first and second wheel via the stator, the inner rotor and the outer rotor.

According to yet another embodiment of the present disclosure the first inverter may be configured to provide a secondary power to the inner rotor which is proportional to an inner rotor torque and/or a wheel speed difference.

According to yet another embodiment of the present disclosure the stator may be a wound stator.

According to yet another embodiment of the present disclosure the inner rotor may be a wound rotor.

According to yet another embodiment of the present disclosure the outer rotor may be a permanent magnet rotor, for instance having an outer magnet array and an inner magnet array, or a squirrel-cage rotor, and/or comprises a rotor yoke having a yoke thickness that is large or may be small compared to a yoke thickness of the stator and/or the inner rotor. A large wall thickness of the outer rotor yoke enables magnetic decoupling of the stator and the inner rotor. A small wall thickness of the outer rotor yoke enables magnetic coupling of the stator and the inner rotor.

According to yet another embodiment of the present disclosure the first inverter may be connected to the inner rotor via a slip ring unit. The slip ring unit may comprise three slip rings, each of the slip rings having a thickness between 0.5 cm and 1.5 cm, for instance of 1 cm, and a radius between 1.5 cm and 2.5 cm, for instance of 2 cm.

According to yet another embodiment of the present disclosure the first and second wheel may be drivingly connectable to the inner and the outer rotor, respectively, by a fixed reduction, for instance by a planetary gear set.

According to yet another embodiment of the present disclosure the torque vectoring unit may further comprise a controller configured to control a speed of the first wheel by controlling an inner rotor current from the first inverter and to control a speed of the second wheel by controlling a stator current from the second inverter, wherein an outer rotor torque equals a sum of a stator torque and an inner rotor torque.

According to yet another embodiment of the present disclosure the controller may be configured to generate a first torque set point for the first wheel and second torque set point for the second wheel, to control an inner rotor current according to the first torque set point, and to control a stator current according to the second torque set point.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

In the following, an embodiment of the torque vectoring system according to the present disclosure is described in more detail on the basis of the following figures. The described features are not only conceivable in the combination of the disclosed embodiment, but can be realized independently of the concrete embodiment in various other combinations. In the figures, equal or similar features are denoted by equal or similar reference signs.

DETAILED DESCRIPTION

Figure 1:
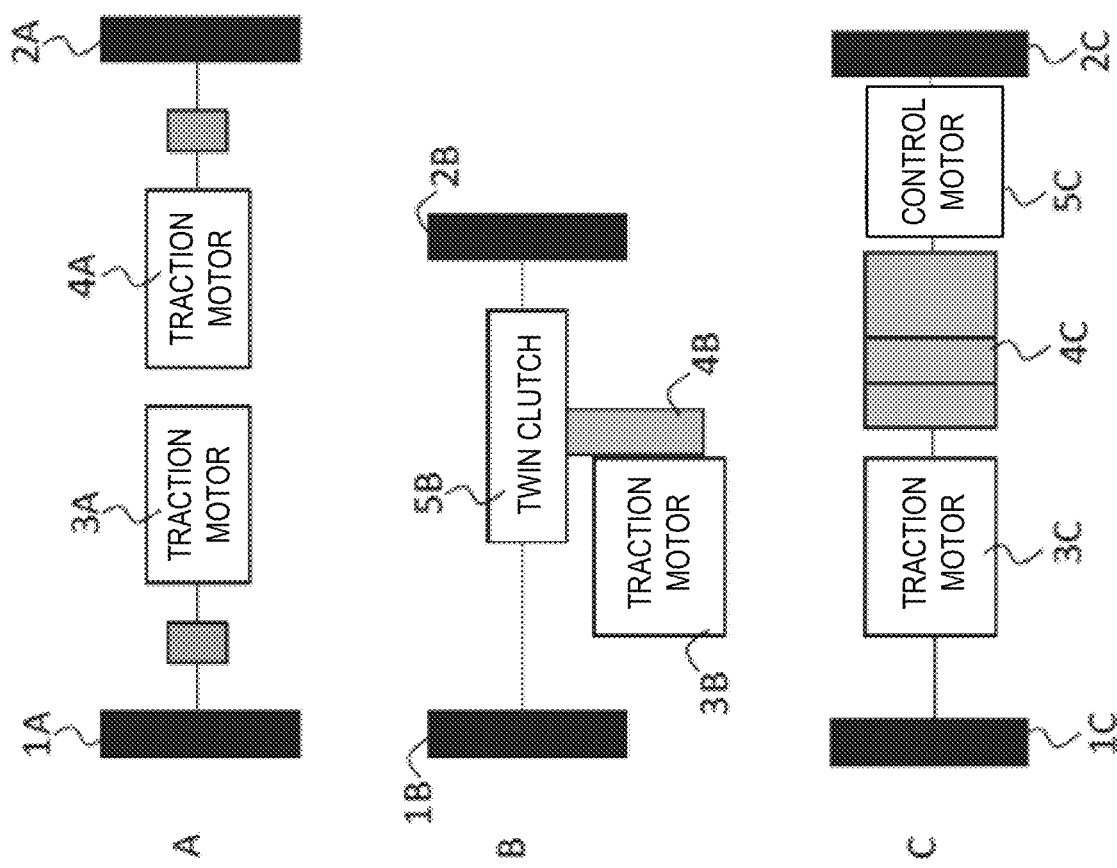
FIG. 1 shows some known torque vectoring systems of the prior art.
Figure 2:
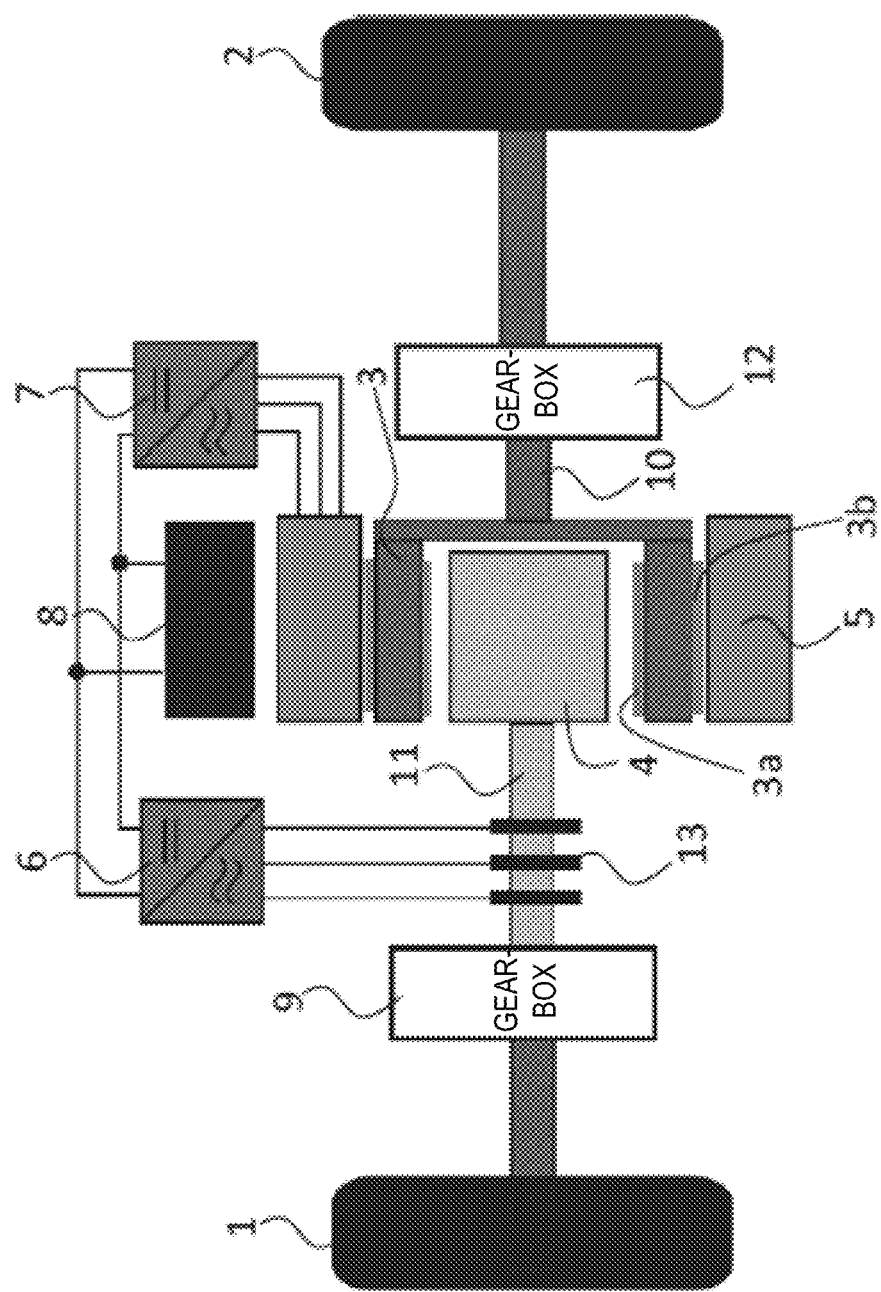
FIG. 2 shows an embodiment of the torque vectoring unit according to the present disclosure.

An embodiment of the torque vectoring unit according to the present disclosure is shown in FIG. 2. The torque vectoring unit of FIG. 2 is based on an electric variable transmission (EVT) unit. An EVT is an electric powersplit transmission. The EVT may include a wound stator, a (permanent magnet) outer rotor, and a wound inner rotor. Both the stator and inner rotor are supplied by a separate inverter. In the present disclosure, this kind of system is used as torque vectoring e-axle. The outer and inner rotor are each connected to a wheel, such as via a fixed reduction (e.g. a planetary gear set)

In most applications, the EVT is used as powersplit transmission between combustion engine and wheels in a hybrid electric vehicle. In the latter case, the inner rotor is typically connected to the combustion engine, while the outer rotor is connected to both wheels via an open differential. However, in the present disclosure an EVT is employed as torque vectoring unit in a purely electric vehicle. This results in a small inner rotor inverter, e.g. in the order of 10 kW, so that only one high power inverter, e.g. of 150-200 kW depending on the desired vehicle power, is utilized as will be explained below. Also the slip ring unit can be chosen to be relatively small, e.g. including three slip rings having a thickness of about 1 cm and a radius of about 2 cm.

The torque vectoring unit of FIG. 2 comprises a first electric motor and a second electric motor. The first electric motor is represented by an inner rotor 4 and an inner permanent magnet array 3a of an outer rotor 3. The second electric motor is represented by an outer permanent magnet array 3b of the outer rotor 3 and a stator 5. The outer rotor 3 encloses the inner rotor 4 and the stator 5 encloses the outer rotor 3. The inner rotor 4, the outer rotor 3 and the stator 5 are concentrically arranged to one another. Moreover, the inner rotor 4 is drivingly connectable to a first wheel 1 via a first shaft 11. The outer rotor 3 is drivingly connectable to a second wheel 2 via a second shaft 10. In addition, a gearbox 9 is arranged on the first shaft 11 between the inner rotor 4 and the first wheel 1 to modulate a torque that is transferred from the inner rotor 4 to the first wheel 1. Analogously, a gearbox 12 is arranged on the second shaft 10 between the outer rotor 3 and the second wheel 2 to modulate a torque that is transferred from the outer rotor 3 to the second wheel 2. The torque vectoring unit further comprises a first inverter 6 and a second inverter 7, wherein the first inverter 6 is electrically connected to the inner rotor 4 via a slip ring unit 13 and the second inverter 7 is electrically connected to the stator 5. Stator 5 is a wound stator. The outer rotor 3 is a permanent magnet rotor having the inner magnet array 3a and the outer magnet array 3b. The inner rotor 4 is a wound rotor. Both the first inverter 6 and the second inverter 7 are connected to a battery 8.

As in a conventional electric machine, the second electric motor has the stator 5 (with windings) and the outer magnet array 3b (permanent magnet array) of the outer rotor 3. There is an electromagnetic force between the current in the windings of the stator 5 and the magnets of the magnet array 3b, resulting in torque. The first electric motor has the inner rotor 4 (having windings) and the inner magnet array 3a (permanent magnet array) of the outer rotor 3. This means, in the first electric motor, the inner rotor 4 acts as a (rotating) stator, and an electromagnetic force between the current in the windings of the inner rotor 4 and the magnets of the magnet array 3a result in torque. So both electric motors exert torque on the outer rotor 3. The reaction torque of the first motor is present on the inner rotor which is a rotating stator with windings.

The EVT of FIG. 2 as torque vectoring unit can provide a different torque on the inner 4 and outer rotor 3, resulting in the possibility of torque vectoring. Both rotors 3 and 4 can hereby be rotating at different speeds. A main power is provided by the second inverter 7 (also denoted as main inverter) connected to the stator 5. The first inverter 6 (also denoted as auxiliary inverter) connected to the inner rotor 4 converts power proportional to an inner rotor torque and a wheel speed difference between wheels 1 and 2. This will be explained next.

By sending a current through the stator windings of stator 5, an electromagnetic torque $T_s$ on the stator 5 will result. This torque $T_s$ depends on the stator current and the magnetic flux linked with the stator windings, as is the case for a conventional electrical machine. By sending current through the inner rotor 4, an electromagnetic torque $T_{r1}$ on the inner rotor 4 results. This torque $T_{r1}$ depends on the inner rotor current, and the magnetic flux linked with the inner rotor 4. The electromagnetic torque $T_{r1}$ equals the torque on wheel 1, possibly modulated by the gearbox 9. The outer rotor torque $T_{r2}$ finally follows from Newton's third law of action reaction since $T_s + T_{r1} + T_{r2} = 0$. Thus, by controlling the currents in stator 5 and inner rotor 4 (which can be done by the corresponding inverters 6 and 7), the torques on both rotors 3 and 4 (wheels 1 and 2) can be controlled independently. The electromagnetic torque $T_{r2}$ on the outer rotor 3 equals the torque on the second wheel 2, possibly modulated by the gearbox 12. Note that the stator torque $T_s$ is the reaction torque on the stationary stator 5.

Figure 3:
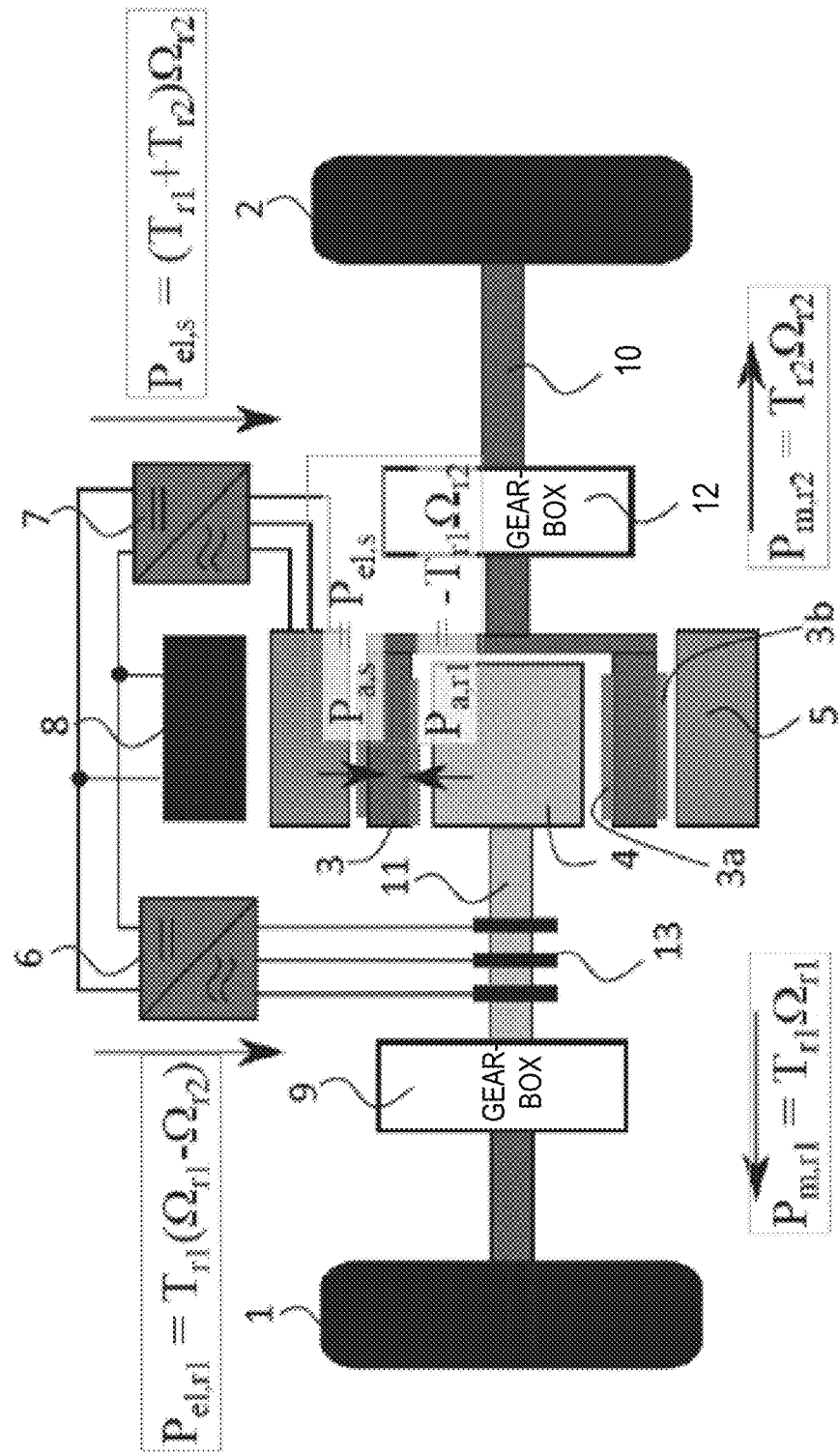
FIG. 3 shows an ideal power flow in the torque vectoring unit according to the embodiment of FIG. 2.

FIG. 3 shows an ideal (loss-less) power flow in the torque vectoring unit according to the embodiment of FIG. 2. The second (main) inverter 7 supplies the stator 5 with electrical power $P_{el,s}$ from a dc-bus (e.g. the battery 8). The second inverter 7 controls the stator currents, in order to achieve a desired electromagnetic torque $T_s$ on the stator 5. If losses are
not considered, the electrical power to the stator 5 is converted to so-called electromagnetic power or airgap power $P_{a,s}$ which transfers the airgap between the stator 5 and the outer rotor 3. This electromagnetic power $P_{a,s}$ equals the electromagnetic torque $T_s$ provided by the stator 5 times the speed of the magnetic field in the airgap. With $T_s$ being the reaction torque on the stator 5, and $\Omega_{r2}$ being the speed of the outer rotor 3, this power equals:

$$P_{a,s} = -T_s \Omega_{r2} = (T_{r1} + T_{r2})\Omega_{r2}$$

From the previous equation, the second inverter 7 provides all power to the wheels 1 and 2 if the wheel speeds are equal. If there is a differential speed between both wheels 1 and 2, the first inverter 6 will convert some of the power, as will be explained next.

The first inverter 6 provides electrical power to the inner rotor windings. The first inverter 6 is here connected to the same dc-bus as the second inverter 7 (as is done in FIGS. 2 and 3), but can also be connected to a different dc-bus (e.g. an 48V dc-bus). The air gap power $P_{a,r1}$ transferring the air gap between both rotors 3 and 4 equals the electromagnetic torque $T_{r1}$ provided by the inner rotor 4 times the speed of the magnetic field in the airgap with respect to the windings of the inner rotor 4. With $T_{r1}$ being the electromagnetic torque on the inner rotor 4, and $\Omega_{r2}$ being the speed of the inner rotor 4, this power equals:

$$P_{a,r1} = T_{r1}(\Omega_{r2} - \Omega_1)$$

As shown in FIG. 3, part of the electrical power to the inner rotor 3 is directly transferred to the corresponding wheel 1, while another part can be transferred to the outer rotor 4, i.e. to the other wheel 2. Since the wheel speed difference is generally low, the power rating of the first inverter 3 can be much lower than the second inverter 4. As a result, also the slip rings 13 via which the inner rotor 3 is provided with power can be very small.

Figure 4:
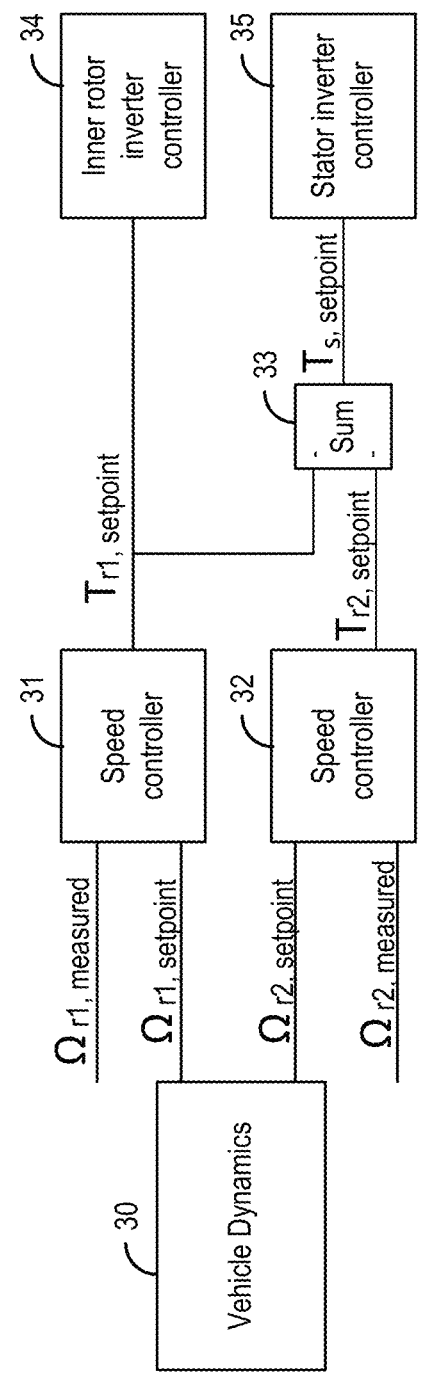
FIG. 4 shows a control scheme for the torque vectoring unit according to the embodiment of FIG. 2.

FIG. 4 shows a control scheme for the torque vectoring unit according to the embodiment of FIG. 2. Based on driver inputs and measurements, the vehicle dynamics controller 30 provides setpoints $\Omega r_{1,setpoint}$ and $\Omega_{r2,setpoint}$ for both wheel speeds $\Omega_1$ and $\Omega_2$ of wheels 1 and 2. The driver inputs may comprise driver-requested speed/torque (e.g., accelerator pedal position, friction brake pedal position, and/or regenerative brake pedal position), driver-requested steering angle, and the like. The measurements may comprise sensor measurements (e.g., vehicle speed, electric motor torque/speed, wheel slip). These speeds can be controlled independently by the torque vectoring unit according to the present disclosure. Speed controllers 31 and 32 generate setpoints $T_{r1,setpoint}$ and $T_{r2,setpoint}$ for the torques $T_{r1}$ and $T_{r2}$ on both wheels 1 and 2. The inner rotor torque $T_{r1}$ can be directly controlled by controlling the inner rotor currents by an inner rotor inverter controller 34, which is the controller of the low-power, first inverter 6. The torque $T_{r2}$ on the outer rotor 3, on the other hand, equals the (negative) sum 33 of the electro-magnetic torque $T_s$ on stator 5 and inner rotor 4. Thus, by additionally controlling the stator currents by a stator inverter controller 35, which is the controller for the second inverter 7, the torque $T_{r2}$ on the outer rotor 3 can be controlled as well, yielding the required wheels speeds $\Omega_1$ and $\Omega_2$. The vehicle dynamics controller 30, the speed controllers 31 and 32, the inner rotor inverter controller 34 and the stator inverter controller 35 may be parts or sections of a central controller of the torque vectoring unit.

FIGS. 2-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A torque vectoring unit for an electric vehicle, comprising
an inner rotor, an outer rotor enclosing the inner rotor, and a stator enclosing the outer rotor, the inner rotor, the outer rotor and the stator being concentrically arranged to one another,
wherein the inner rotor is drivingly connectable to a first wheel and the outer rotor is drivingly connectable to a second wheel, and
wherein the inner rotor and the outer rotor represent a first electric motor and the outer rotor and the stator represent a second electric motor.

2. The torque vectoring unit according to claim 1, further comprising a first inverter and a second inverter, wherein the first inverter is electrically connected to the inner rotor and the second inverter is electrically connected to the stator.

3. The torque vectoring unit according to claim 2, wherein the first inverter is a low-power inverter and the second inverter is a high-power inverter.

4. The torque vectoring unit according to claim 2, wherein the second inverter is configured to provide a main power to the first wheel and the second wheel via the stator, the inner rotor, and the outer rotor.

5. The torque vectoring unit according to claim 2, wherein the first inverter is configured to provide a secondary power to the inner rotor which is proportional to an inner rotor torque and/or a wheel speed difference.

6. The torque vectoring unit according to claim 2, wherein the first inverter is connected to the inner rotor via a slip ring unit.

7. The torque vectoring unit according to claim 6, wherein the slip ring unit comprises three slip rings, each of the slip rings having a thickness between 0.5 cm and 1.5 cm, and a radius between 1.5 cm and 2.5 cm.

8. The torque vectoring unit according to claim 2, further comprising a controller configured to control a speed of the first wheel by controlling an inner rotor current of the first inverter and to control a speed of the second wheel by controlling a stator current of the second inverter, wherein an outer rotor torque equals a sum of a stator torque and an inner rotor torque.

9. The torque vectoring unit according to claim 8, wherein the controller is further configured to
generate a first torque set point for the first wheel and a second torque set point for the second wheel,
control the inner rotor current according to the first torque set point, and
control the stator current according to the second torque set point.

10. The torque vectoring unit according to claim 1, wherein the stator is a wound stator.

11. The torque vectoring unit according to claim 1, wherein the inner rotor is a wound rotor.

12. The torque vectoring unit according to claim 1, wherein the outer rotor is a permanent magnet rotor having an outer magnet array and an inner magnet array, or a squirrel-cage rotor, and/or comprises a rotor yoke having a yoke thickness that is small compared to a yoke thickness of the stator and/or the inner rotor.

13. The torque vectoring unit according to claim 1, wherein the first wheel and the second wheel are drivingly connectable to the inner rotor and the outer rotor, respectively, by a fixed reduction.

14. A method for a torque vectoring unit of an electric vehicle, comprising:
controlling a speed of a first wheel of the electric vehicle by controlling an inner rotor current of a first inverter of the torque vectoring unit, the first inverter electrically connected to an inner rotor of the torque vectoring unit, the inner rotor drivingly connectable to the first wheel; and
controlling a speed of a second wheel of the electric vehicle by controlling a stator current of a second inverter of the torque vectoring unit, the second inverter electrically connected to a stator of the torque vectoring unit, the stator enclosing an outer rotor that is drivingly connectable to the second wheel.

15. The method of claim 14, further comprising generating a first torque set point for the first wheel and a second torque set point for the second wheel;
controlling the inner rotor current according to the first torque set point; and
controlling the stator current according to the second torque set point.

16. The method of claim 15, wherein generating the first torque set point and the second torque set point comprises generating the first torque set point and the second torque set point based on driver inputs and/or sensor measurements.

17. The method of claim 14, wherein controlling the speed of the first wheel of the electric vehicle by controlling the inner rotor current of the first inverter is performed in response to a speed differential between the speed of the first wheel and the speed of the second wheel.

18. The method of claim 17, further comprising providing power to the first wheel and the second wheel via the second inverter responsive to the speed of the first wheel being equal to the speed of the second wheel.

19. The method of claim 14, wherein the first inverter is a low-power inverter and the second inverter is a high-power inverter.

20. The method of claim 14, wherein the outer rotor encloses the inner rotor, such that the inner rotor, the outer rotor, and the stator are concentrically arranged to one another.

* * * * *